T. E. MURRAY.
COUPLING FOR FLANGED TUBES OR PIPES.
APPLICATION FILED JAN. 24, 1917.

1,227,179.

Patented May 22, 1917.

INVENTOR
Thomas E. Murray
BY
ATTORNEY

UNITED STATES PATENT OFFICE.

THOMAS E. MURRAY, OF NEW YORK, N. Y.

COUPLING FOR FLANGED TUBES OR PIPES.

1,227,179.  Specification of Letters Patent.  Patented May 22, 1917.

Application filed January 24, 1917. Serial No. 144,132.

*To all whom it may concern:*

Be it known that I, THOMAS E. MURRAY, a citizen of the United States, residing at New York, in the county of New York and State of New York, have invented a certain new and useful Improvement in Couplings for Flanged Tubes or Pipes, of which the following is a specification.

The invention relates to couplings for flanged tubes or pipes, and consists in the loops of metal radially disposed around said tube and homogeneously united to said flange. When two flanged tubes are to be coupled, the loops on the respective tubes receive and are connected by bolts.

In the accompanying drawings—

Figures 1, 2:
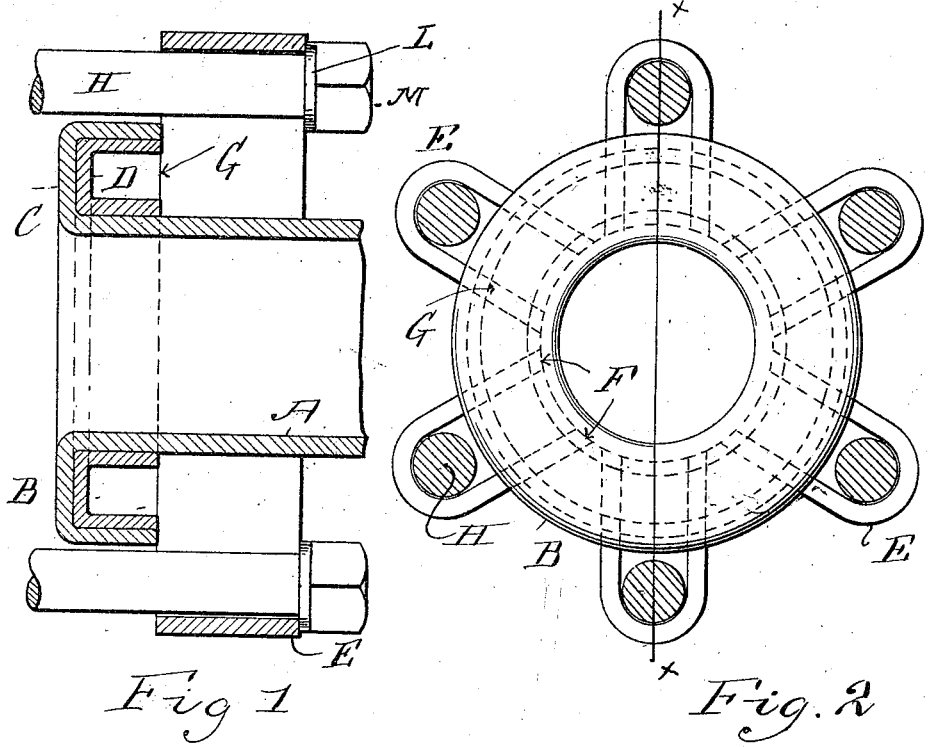
Figures 3, 4:
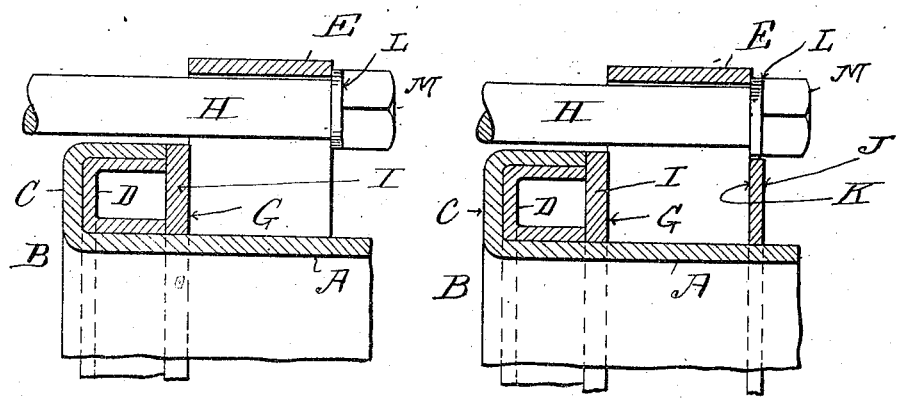

Figure 1 is a section on the line x, x of Fig. 2. Fig. 2 is a plan view of the left hand end of Fig. 1, the connecting bolts being in section. Figs. 3 and 4 are partial sections similar to Fig. 1, showing modified forms of my device.

Similar letters of reference indicate like parts.

A is a pipe or tube of metal. B is a flange on the end thereof. Preferably, I use the flange here specifically illustrated, comprising a channeled ring C, electrically welded to the end of the tube, in which is seated a second channeled ring D, the outer circumferential edge of ring C and both circumferential edges of ring D being flat and in the same plane. This construction of flange I do not herein claim, since it is set forth in my pending application Serial No. 134,008, filed December 28th, 1916.

My present object is to combine with the flange a permanent coupling, or additional flange, which shall add but little to the weight and yet be extremely strong, as well as cheap to manufacture. To this end, I bend a number of metal plates to form loops, as shown at E. These loops are all alike, and can be stamped or pressed into shape, and there may be as many of them as the strength of the connection demands. I chamfer or curve the end faces F of the loops to fit against the circular periphery of the tube. I then secure the loops in place by electrically welding a side edge G of each to the flange B. In the case of the particular flange here illustrated, the weld will be made between the side edge G and the three edges of rings C, D. In addition, I may also electrically weld the curved faces F of the ends of the loops to the tube periphery. In connecting together two tubes each provided with flanges B and loops A, as described, I use simply ordinary headed bolts, as H, passing through the loops E. Where increased strength is desired, I may interpose a washer ring I, as shown in Fig. 3, between the edges G of the loop and the flange B, electrically welding said ring both to the edges G of the loop and to said flange, and, if desired, to the tube also; and for still further reinforcement, I may add another washer ring J and weld the same to the opposite side edges K of the loops, and also to the tube, if desired. The rings I, J serve to bind the individual loops E together.

Washers L may be placed under the bolt heads M. These may be circular in the forms of my device shown in Figs. 1 and 3. In the form shown in Fig. 4, the washer may have one side curved to conform to the circumference of ring J.

I claim:

1. A tube, a flange on the end thereof, and a plurality of metal loops disposed radially around said tube with their ends in contact therewith and having their corresponding side edges homogeneously united to said flange.

2. A tube, a flange on the end thereof, a ring on said tube homogeneously united to said flange, and a plurality of metal loops disposed radially around the tube with their ends in contact therewith and having their corresponding edges homogeneously united to said ring.

3. A tube, a flange on the end thereof, a ring on said tube homogeneously united to said flange, a plurality of metal loops disposed radially around the tube with their ends in contact therewith and having their corresponding edges homogeneously united to said ring, and a ring also on said tube and homogeneously united to the opposite edges of said loops.

In testimony whereof I have affixed my signature in presence of two witnesses.

THOMAS E. MURRAY.

Witnesses:
  GERTRUDE T. PORTER,
  MAY T. MCGARRY.